United States Patent
Snead

(10) Patent No.: US 11,203,846 B2
(45) Date of Patent: Dec. 21, 2021

(54) THERMOCHROMATIC REFLECTIVE PAVEMENT MARKERS FOR INDICATING CHANGING ROAD CONDITIONS

(71) Applicant: Walter L. Snead, Columbus, OH (US)

(72) Inventor: Walter L. Snead, Columbus, OH (US)

(*) Notice: Subject to any disclaimer, the term of this patent is extended or adjusted under 35 U.S.C. 154(b) by 837 days.

(21) Appl. No.: 16/029,555

(22) Filed: Jul. 7, 2018

(65) Prior Publication Data
US 2019/0017235 A1 Jan. 17, 2019

Related U.S. Application Data

(60) Provisional application No. 62/530,979, filed on Jul. 11, 2017.

(51) Int. Cl.
| | | |
|---|---|---|
| *E01F 9/40* | (2016.01) | |
| *G02F 1/01* | (2006.01) | |
| *G02B 5/12* | (2006.01) | |
| *C09D 5/26* | (2006.01) | |
| *C09K 9/02* | (2006.01) | |
| *E01F 9/524* | (2016.01) | |
| *E01F 9/553* | (2016.01) | |
| *E01F 9/559* | (2016.01) | |

(52) U.S. Cl.
CPC ............... *E01F 9/40* (2016.02); *E01F 9/524* (2016.02); *E01F 9/553* (2016.02); *E01F 9/559* (2016.02); *G02B 5/12* (2013.01); *G02F 1/0147* (2013.01); *C09D 5/26* (2013.01); *C09K 9/02* (2013.01); *G02F 2203/02* (2013.01)

(58) Field of Classification Search
CPC ... E01F 9/40; E01F 9/524; E01F 9/553; E01F 9/559; C09K 9/02; C09D 5/26
See application file for complete search history.

(56) References Cited

U.S. PATENT DOCUMENTS

| | | | | |
|---|---|---|---|---|
| 5,897,271 A | * | 4/1999 | Widmer ................... | E01F 9/40 404/14 |
| 6,533,440 B2 | * | 3/2003 | Koyama .............. | G02B 6/0055 362/296.04 |
| 6,911,917 B2 | * | 6/2005 | Higgs ..................... | B60Q 7/00 340/693.1 |
| 7,465,693 B2 | * | 12/2008 | Greer .................... | G09F 19/228 503/200 |
| 8,231,240 B1 | * | 7/2012 | Rubio ...................... | F21S 9/04 362/192 |

(Continued)

*Primary Examiner* — Abigail A Risic
(74) *Attorney, Agent, or Firm* — Porter, Wright, Morris & Aurthur, LLP

(57) ABSTRACT

A reflective pavement marker for a roadway includes a body having a bottom adapted to be secured to the roadway and at least one a reflector on the body. The reflector includes an outer face for receiving light and an inner face comprising a plurality of light reflecting elements for receiving and reflecting the light back through the outer face. The reflector comprises a light transmitting and thermochromatic polymer adapted to transition at a predetermined transition temperature so as to change the color of the light reflected by the reflector depending on the temperature of the polymer. The predetermined transition temperature can be selected so that the color change of the light reflected by the reflector indicates freezing or near freezing road conditions.

20 Claims, 6 Drawing Sheets

(56) References Cited

U.S. PATENT DOCUMENTS

| | | | | |
|---|---|---|---|---|
| 8,840,335 | B2* | 9/2014 | Martin | E01F 9/40 |
| | | | | 404/12 |
| 9,790,652 | B1* | 10/2017 | Kim | G09F 13/16 |
| 2005/0025570 | A1* | 2/2005 | Snagel | E01F 9/553 |
| | | | | 404/16 |
| 2006/0257204 | A1* | 11/2006 | Matiosian | E01F 9/553 |
| | | | | 404/16 |
| 2008/0060242 | A1* | 3/2008 | Greer | G09F 19/228 |
| | | | | 40/612 |
| 2017/0002526 | A1* | 1/2017 | Hernández Santacruz | |
| | | | | E01F 9/553 |
| 2020/0195723 | A1* | 6/2020 | Bass | H04L 67/2842 |

* cited by examiner

THERMOCHROMATIC REFLECTIVE PAVEMENT MARKERS FOR INDICATING CHANGING ROAD CONDITIONS

CROSS-REFERENCE TO RELATED APPLICATIONS

Not Applicable

STATEMENT REGARDING FEDERALLY SPONSORED RESEARCH

Not Applicable

PARTIES TO A JOINT RESEARCH AGREEMENT

Not Applicable

REFERENCE TO APPENDIX

Not Applicable

FIELD OF THE INVENTION

The field of the present invention generally relates to reflective pavement markers and, more particularly, to reflective pavement markers that indicate changing road temperature conditions.

BACKGROUND OF THE INVENTION

A reflective pavement marker is a safety device used on roads that typically is easier to see than painted lines, particularly at night. These reflective pavement markers are usually made of plastic, ceramic, or metal, and come in a variety of shapes and colors. A reflective pavement marker typically includes a lens and/or a prism that enhances visibility by reflecting automotive headlights back to the drivers. Some specific types of pavement markers include convex vibration lines, Botts' dots, delineators, cat's eyes, road studs, or road turtles. Sometimes these pavement markers are simply referred to as "reflectors".

In the United States, Canada, and Australia, these reflective pavement markers typically have two angled faces facing in opposite directions and containing reflective surfaces on one or both of the angled faces. In geographic areas where snowplowing is frequent, the reflective pavement markers are typically placed in a shallow groove cut in the pavement, or specially designed reflective pavement markers are used which include a protective metal body such as a casting that is embedded in a recess in the pavement, allowing the reflective pavement marker to protrude slightly above the pavement surface for increased visibility. In areas with little snowfall, reflective pavement markers are applied directly to the road surface rather than being embedded in the road surface. The reflective surface or surfaces enable the reflective road marker to be clearly visible at long distances at night and in rainy weather. A current trend for lane markings is to intersperse retroreflective paint lines with retroreflective pavement markers as seen on the majority of highways in the United States.

Reflective pavement markers can have one of many different reflector colors depending on local traffic marking standards. In North America: white pavement markers are typically used to indicate lane markings or a right-side pavement edge; yellow or orange pavement markers are typically used to indicate a separation of traffic moving in opposite directions or a left-side pavement edge on one-way roadways; red pavement markers are typically used to indicate areas that are closed to traffic; blue pavement markers are typically used in the center of the roadway to indicate the presence of a fire hydrants on the shoulder or at the curb of the roadway; and green pavement markers are typically used to indicate that emergency vehicles can open gates to enter a gated community. These reflector colors can also be combined on the same marker, such as with a different reflector color facing each direction. For example, white and red or yellow and red where the white or yellow reflector indicates normal use in one direction, and the red reflector indicates "do not enter" or "wrong way" in the other direction. Also for example, red-clear reflectors where the red reflector warns motorists they are going the wrong way in one direction and the clear reflector is not visible to motorists traveling in the correct direction in the other direction. Further for example, white and black reflectors where the white reflector indicates lane restrictions (such as a high-occupancy vehicle (HOV) diamond) in one direction on a roadway that has "reversible" traffic flow and the black reflector in the other direction indicates the markings do not apply.

It has been proposed to have reflective pavement markers with a temperature dependent color in order to alert motorists of possible icy road conditions by having a different color at freezing and/or below temperatures, than at above freezing temperatures. For example, see U.S. Pat. No. 5,897,271, the disclosure of which is expressly incorporated herein in its entirety by reference. However, the reflective pavement markers of the '271 patent are believed to be cost prohibitive to manufacture and/or have an unacceptable degradation under roadway conditions.

Accordingly, there is a need in the art for improved reflective pavement markers.

SUMMARY OF THE INVENTION

Disclosed are reflective pavement markers that overcome at least one of the disadvantages of the prior art described above. Disclosed is a reflective pavement marker for a roadway comprising, in combination, a body having a bottom adapted to be secured to the roadway and a reflector on the body. The reflector has an outer face for receiving light and an inner face comprising a plurality of light reflecting elements for receiving and reflecting the light back through the outer face. The reflector comprises a light transmitting and thermochromatic polymer adapted to transition at a predetermined transition temperature so as to change the color of the light reflected by the reflector depending on the temperature of the polymer.

Also disclosed is a reflective pavement marker for a roadway comprising, in combination, a body having a bottom adapted to be secured to the roadway and opposed first and second reflectors on the body. Each of the first and second reflectors has an outer face for receiving light and an inner face comprising a plurality of light reflecting elements for receiving and reflecting the light back through the outer face. At least one of the first and second reflectors comprises a light transmitting and thermochromatic polymer adapted to transition at a predetermined transition temperature so as to change the color of the light reflected by the reflector depending on the temperature of the polymer.

From the foregoing disclosure and the following more detailed description of various preferred embodiments it will be apparent to those skilled in the art that the present invention provides a significant advance in the technology and art of raised pavement markers. Particularly significant in this regard is the potential the invention affords for reflective pavement markers that are not cost prohibitive, have acceptable degradation under roadway conditions, and can indicate changing road conditions with regard to freezing temperatures. Additional features and advantages of various preferred embodiments will be better understood in view of the detailed description provided below.

BRIEF DESCRIPTION OF THE DRAWINGS

These and further features of the present invention will be apparent with reference to the following description and drawings.

Figure 1:
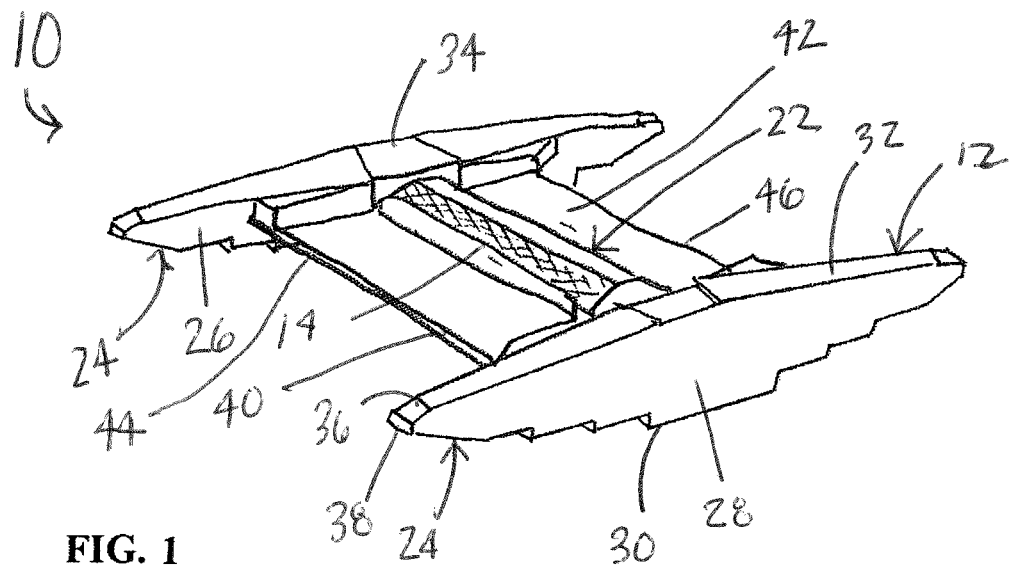
FIG. 1 is a perspective view of a raised reflective pavement marker according to a first embodiment of the present invention.
Figure 2:
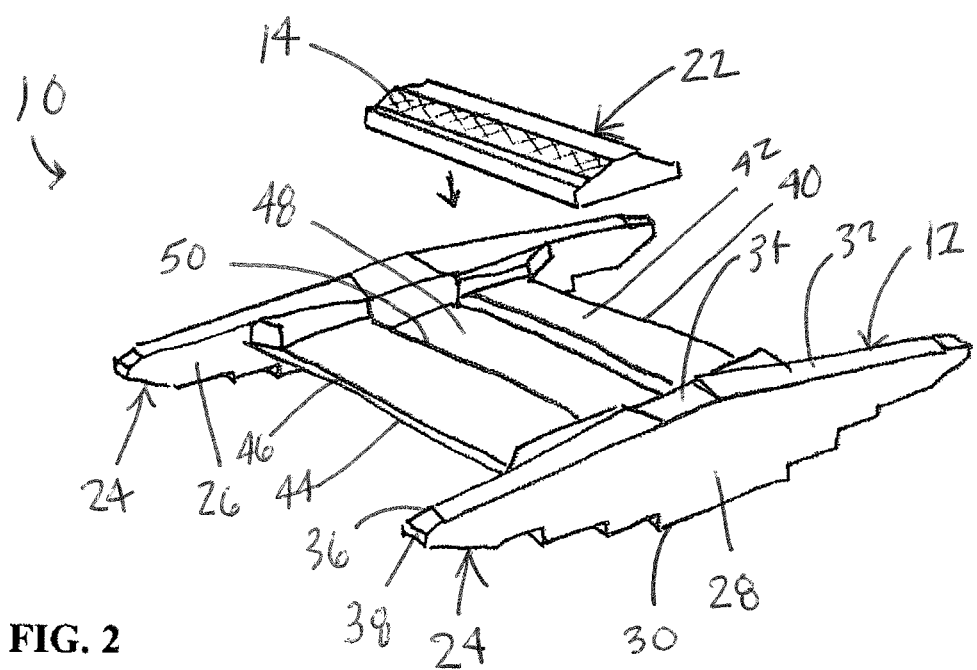
FIG. 2 is an exploded view of the raised reflective pavement marker of FIG. 1.
Figure 3:
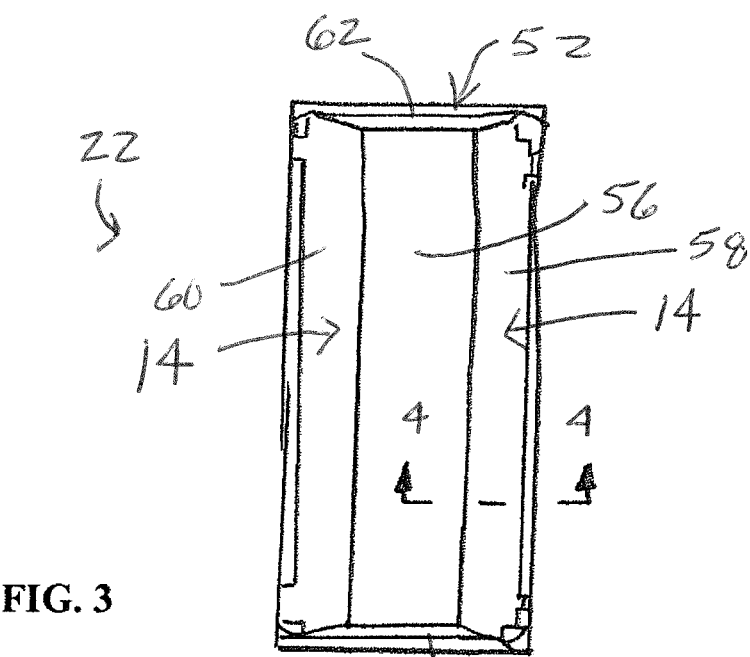
FIG. 3 is a top plan view of a reflector member of the raised reflective pavement marker of FIGS. 1 and 2.

It should be understood that the appended drawings are not necessarily to scale, presenting a somewhat simplified representation of various preferred features illustrative of the basic principles of the invention. The specific design features of the reflective pavement markers as disclosed herein, including, for example, specific dimensions and shapes of the various components will be determined in part by the particular intended application and use environment. Certain features of the illustrated embodiments have been enlarged or distorted relative to others to facilitate visualization and clear understanding. In particular, thin features may be thickened, for example, for clarity or illustration. All references to direction and position, unless otherwise indicated, refer to the orientation of the mobile storage systems illustrated in the drawings. In general, up or upward refers to an upward direction generally within the plane of the paper in FIG. 1 and down or downward refers to a downward direction generally within the plane of the paper in FIG. 1. Also in general, forward or front refers to a direction extending out of the plane of the paper in FIG. 1 and back or rear refers to a direction extending into the plane of the paper in FIG. 1.

DETAILED DESCRIPTION OF CERTAIN PREFERRED EMBODIMENTS

It will be apparent to those skilled in the art, that is, to those who have knowledge or experience in this area of technology, that many uses and design variations are possible for the reflective pavement markers disclosed herein. The following detailed discussion of various alternative and preferred embodiments will illustrate the general principles of the invention with regard to raised reflective pavement markers. Other embodiments suitable for other applications will be apparent to those skilled in the art given the benefit of this disclosure.

FIGS. 1 to 4 illustrate a reflective pavement marker 10 according to a first embodiment of the present invention. The illustrated reflective pavement marker 10 is a snowplowable raised reflective pavement marker. In use, the snowplowable raised reflective pavement marker 10 is embedded in the pavement of a roadway so as to project above the roadway surface and be visible to oncoming vehicles traveling in either direction along the roadway surface, while being protected from snowplow blades. The illustrated pavement marker 10 includes a body or base 12 having a bottom adapted to be secured to the roadway, and at least one reflector 14 on the body 12 and having an outer face 16 for receiving light and an inner face 18 comprising a plurality of light reflecting elements 20 for receiving and reflecting the light back through the outer face 16. The illustrated reflector 14 comprises a light transmitting and thermochromatic polymer adapted to transition to a different color at a predetermined transition temperature so as to change the color of the light reflected by the reflector 14 depending on the temperature of the thermochromatic polymer.

The illustrated body or base 12 is formed of a relatively high-strength material such as, for example, metal and supports thereon a reflector assembly 22 having first and second reflectors 14a, 14, b facing in the forward and rearward directions respectively. The illustrated first and second reflectors 14a, 14b are sloped or angled so that there outer faces 16 form an acute angle with a horizontal plane. The body or base 12 is preferably cast as an integral unit, and includes a pair of parallel, elongate, and laterally spaced-apart keel members 24. Each of the keel members 24 has parallel and substantially vertically extending inner and outer side surfaces 26, 28. Each of the keel members 24 is provided with a substantially identical irregular bottom surface 30 which interconnects the side surfaces 30 along the bottoms of the keel members 24. Each of the keel members 24 is also provided with a pair of inclined upper surfaces 32 which rise from the opposite ends of the keel member 24 to uppermost portions which join a flat top surface 34 and interconnect the side surfaces 26, 28 at radiused corners to prevent stress concentrations when the body or base 12 is struck by a plow blade. The lower ends of the inclined upper surfaces 32 respectively join short inclined end surfaces 36 which slope downwardly from the inclined upper surfaces 32 toward the adjacent ends of the base 12 and are respectively connected to the ends by short vertical end surfaces 38.

Interconnecting the thickened central portions of the keel members 24 is a web-like support member 40 which is substantially rectangular in plan outline. The support member 40 has a flat planar top surface 42 and an arcuate part-cylindrical convex bottom surface 44 which is connected at the opposite ends thereof to the top surface by short end surfaces 46. Recessed in the top surface centrally thereof and parallel thereto is a support surface 48 and extends transversely substantially all the way across the support member 40, and which is longitudinally substantially coextensive with the recessed side portions of the keel members 24. Substantially vertically extending end walls 50 extend downwardly from the top surface 42 at the opposite ends of the support surface 48, the end walls 50 and the recessed inner side surfaces 26 of the keel members 24 all being connected to the support surface 48 by a peripheral channel or groove which extends all the way around the support surface 48 and is generally arcuate in transverse cross section. It is noted that the base or body 12 can alternatively have any other suitable configuration.

The illustrated reflector assembly 22 is dimensioned to fit between the end walls 50 and the recessed inner side surfaces 26 to be supported upon the support surface 48. The illustrated reflector assembly 22 includes a body or shell 52 of light-transmitting synthetic resin which, in use, is filled or "potted" with a relatively rigid filler material to form a solid core which is contiguous with an inner surface of the shell 52 and serves to reinforce the shell 52 and provide a solid, rugged structure capable of withstanding forces applied to the reflector assembly 22 when the outer surface of the shell 52 is struck by vehicular traffic during service. The shell 52 is provided with a generally horizontal base 54 for cooperatively engaging the support surface 48 on which the reflector assembly 22 is installed. The shell 52 includes a generally horizontal top wall 56 which is raised vertically above the base 54 and is interconnected therewith by opposed inclined front and rear walls 58, 60 and opposed substantially vertically extending side walls 62. The inclined front and rear walls 58, 60 form the first and second reflectors 14*a*, 14*b* respectively. It is noted that the reflector assembly 22 can alternatively have any other suitable configuration.

The illustrated reflectors 14 are retroreflective type reflectors and each includes a generally planar obverse light-receiving outer face 16 on the outer surface of the shell 52 and a reverse light-receiving inner face 18 on the inner surface of the shell 52. The illustrated inner face 18 includes the plurality of light-reflecting elements 20 each having three substantially square planar surfaces arranged mutually at right angles and meeting at a common point remote from the obverse or outer face, thus forming a cube corner, the axis of which is arranged to be generally in alignment with light rays refracted from the obverse or outer face 16. The reverse or inner face 18, including at least the light reflecting elements 20, is preferably coated with a light-reflecting material, such as by metallizing. It is noted that the reflectors 14 can alternatively have any other suitable configuration.

At least the inclined front and rear walls 58, 60 of the shell are formed by a light transmitting and thermochromatic polymer adapted to transition to a different color at a predetermined transition temperature so as to change the color of the light reflected by the reflector depending on the temperature of the thermochromatic polymer. It is noted that the entire shell can be formed of the thermochromatic polymer if desired. The transition temperature typically refers to the temperature at which the polymer is fully at a first or "high temperature" color and below which the polymer transitions to a second or "low temperature' color that is different from the first or "high temperature" color over a transition range. The transition range can be for example about 4 degrees Fahrenheit. The illustrated predetermined transition temperature is such that the change in color of the reflected light indicates that the roadway is at a temperature in which the roadway could be slick due to freezing temperature s or near freezing temperatures. The illustrated predetermined transition temperature is preferably in the range of about 38 degrees Fahrenheit to 30 degrees Fahrenheit, and more preferably about 34 degrees Fahrenheit. The first and second colors can be any suitable colors. The second or "low temperature" color is preferably a color that uniquely indicates a freezing condition such as for example, blue, purple, or the like. For example, a reflector 14 placed on a right-side of a roadway having a first color that is white can have a second color that is blue or purple. It is noted, however, that any colors can be utilized.

The reflector assembly 22 is secured to the support surface 48 of the body or base 12 with the obverse or outer faces 16 of the reflectors 14*a*, 14*b* respectively facing toward the opposite ends of the pavement marker 10, i.e., facing the opposed directions of oncoming vehicles. The reflector assembly 22 is preferably secured to the body or base 12 with adhesive to permit later removal and replacement of the reflector assembly 22 in the event it becomes damaged, worn or the like, without removing the base from the pavement. It is noted that any other suitable means of securement for the reflector assembly 22 can alternatively be utilized. It is also noted that the reflector assembly 22 can alternatively have any other suitable configuration, such as, for example, having only a single one of the reflectors 14 or more than two of the reflectors 14.

Figure 4:
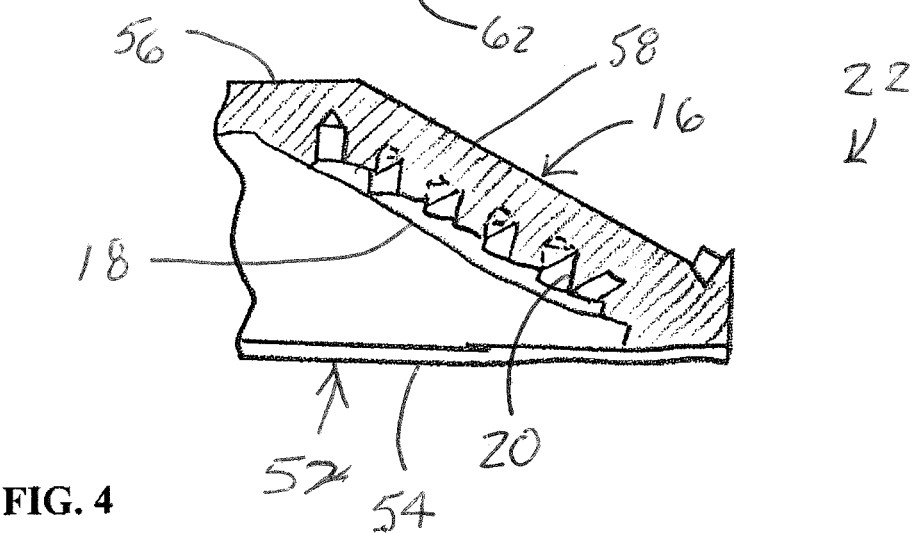
FIG. 4 is a fragmented and enlarged cross-sectional view of the reflector member of FIG. 3 taken along line 4-4 of FIG. 3.
Figure 4A:
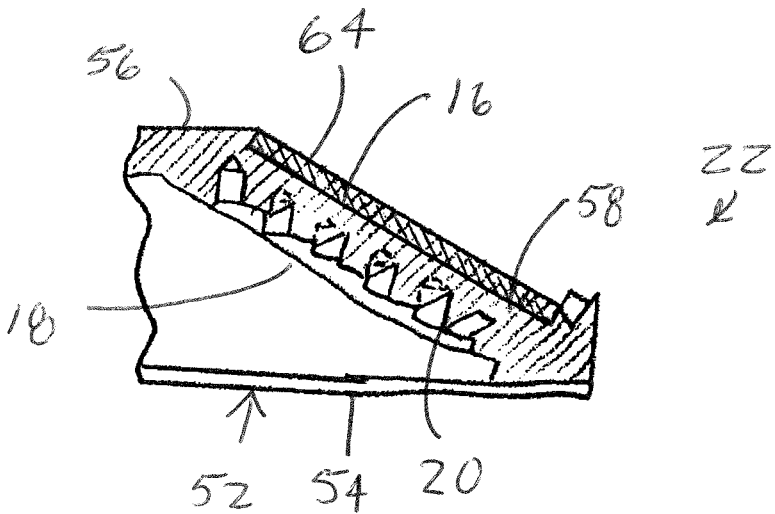
FIG. 4A is a fragmented and enlarged cross-sectional view of the reflector member similar to FIG. 4 but showing a first variation of the reflector.

FIG. 4A illustrates a first variation of the reflectors 14. A flat protective member or overlay 64 overlays the obverse or outer face 16 and which extends substantially the entire length of the obverse or outer face 16. The protective member 64 can comprise any suitable material glass or the like. The protective member 64 can be secured to the associated obverse or outer face 16 by being molded therein, co-molded, secured by adhesive, or any other suitable manner. The protective members serve to provide additional protection against abrasion and/or wear of the obverse or outer faces 16 of the reflectors 14. The protective member 64 preferably operates as a window. That is, the protective member 64 preferably does not substantially alter the path of light entering and exiting the obverse or outer face 16 of the reflector 14

Figure 4B:
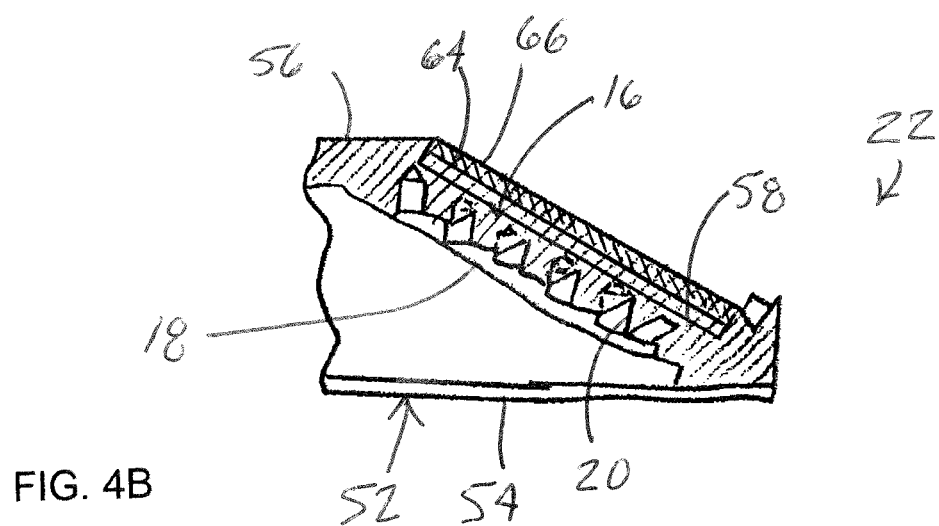
FIG. 4B is a fragmented and enlarged cross-sectional view of the reflector member similar to FIGS. 4 and 4A but showing a second variation of the reflector.

FIG. 4B illustrates a second variation of the reflectors 14. A film or plate 66 comprising the light transmitting and thermochromatic polymer as described above is provided between the protective member 64 and the obverse or outer face 16 of the reflector 14 instead of the inclined wall 58, 60 of the body or shell 52 comprising the light transmitting and thermochromatic polymer. Such a construction permits the inclined walls 58, 60 of the body or shell 52 to be formed of any desired material.

Figure 4C:
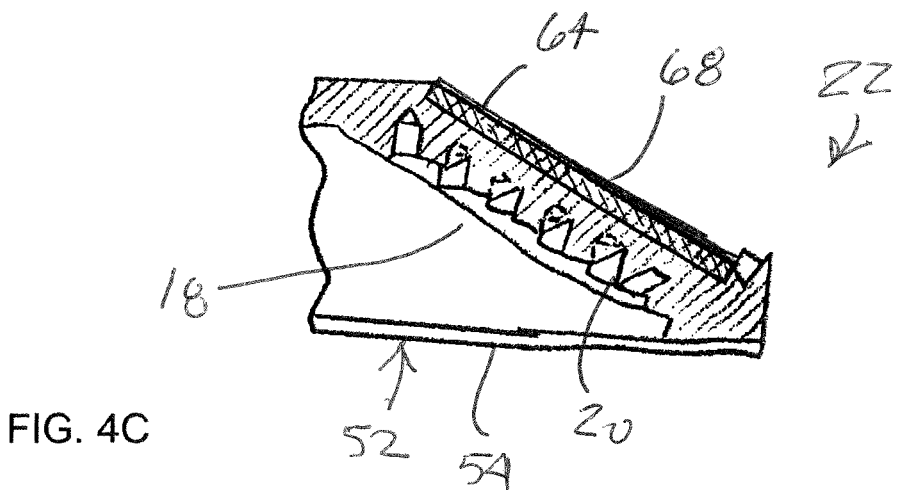
FIG. 4C is a fragmented and enlarged cross-sectional view of the reflector member similar to FIGS. 4, 4A, and 4B but showing a third variation of the reflector.

FIG. 4C illustrates a third variation of the reflectors 14. The obverse or outer faces 16 of the reflectors 14 are coated with an abrasion resistant and light transmitting layer or coating 68. The coating 68 can comprise a diamond like carbon film, a ceramic, a silicon dioxide, or the like. The coating 68 serves to provide additional protection against abrasion of the obverse or outer faces 16 of the reflectors 14. The coating 68 preferably operates as a window. That is, the coating 68 preferably does not substantially alter the path of light entering and exiting the obverse or outer face 16 of the reflector 14. However, is noted that the coating 68 could additionally (for example abrasion resistance and UV light protecting) or alternatively (for example UV light protecting without abrasion resistance) and have other properties such as, for example, UV light protection to protect the thermochromatic polymer.

Figure 5:
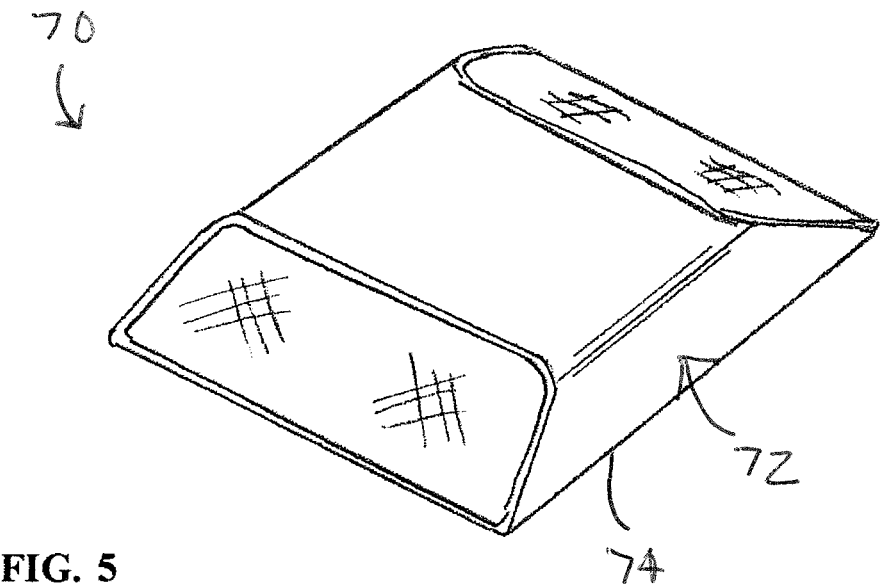
FIG. 5 is a perspective view of a raised reflective pavement marker according to a second embodiment of the present invention.
Figure 6:
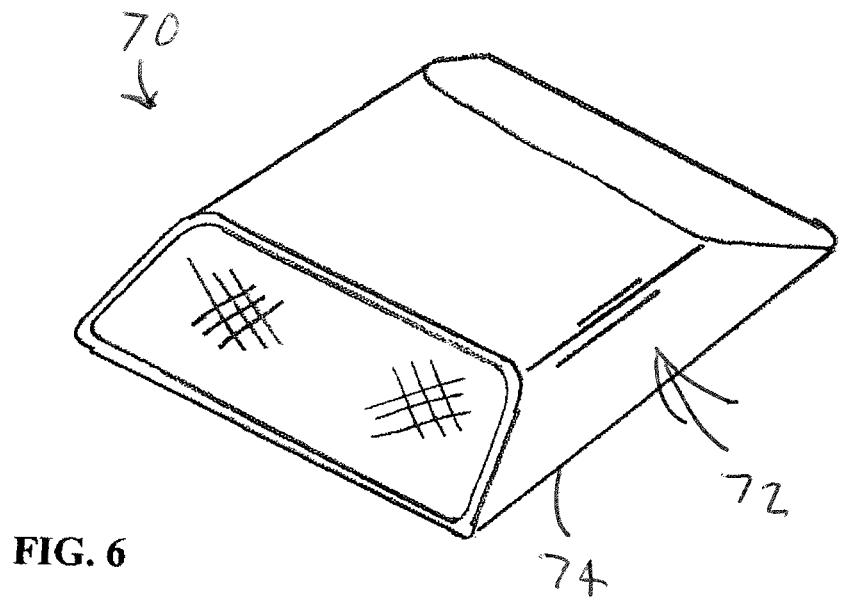
FIG. 6 is a perspective view of a variation of the raised reflective pavement marker of FIG. 5, wherein there is a single reflector.
Figure 7:
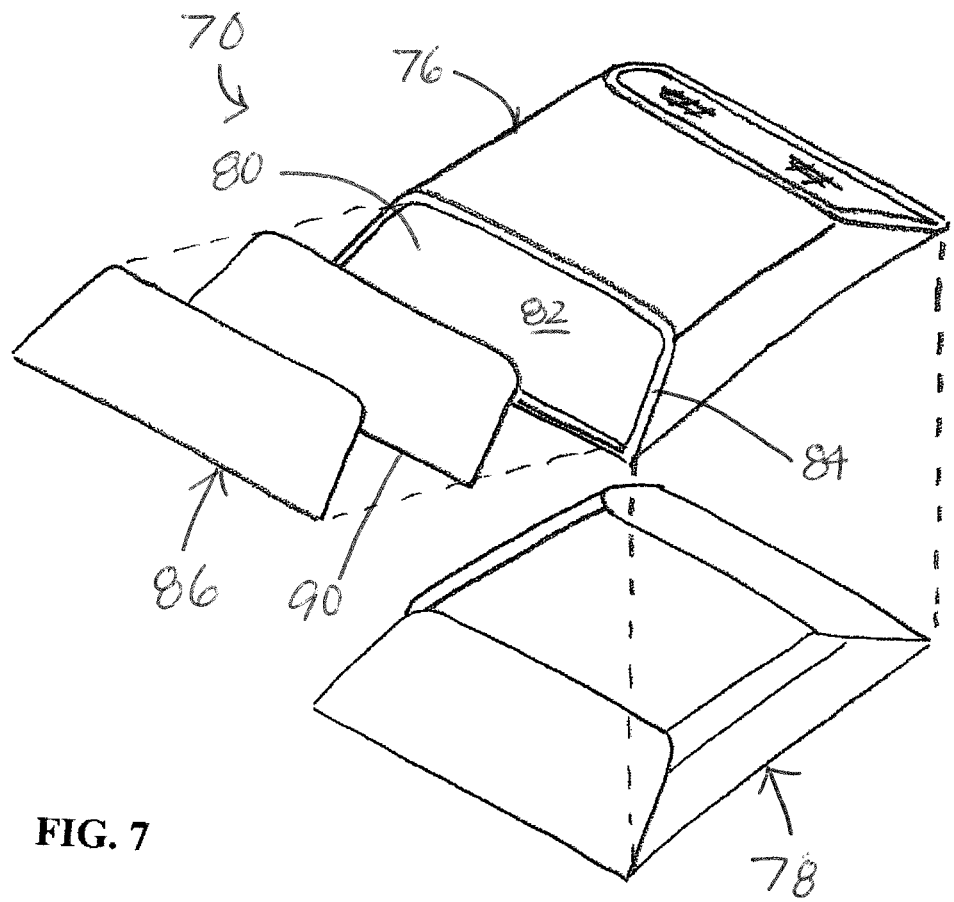
FIG. 7 is a partially exploded view of the raised reflective pavement marker of FIG. 5.
Figure 8:
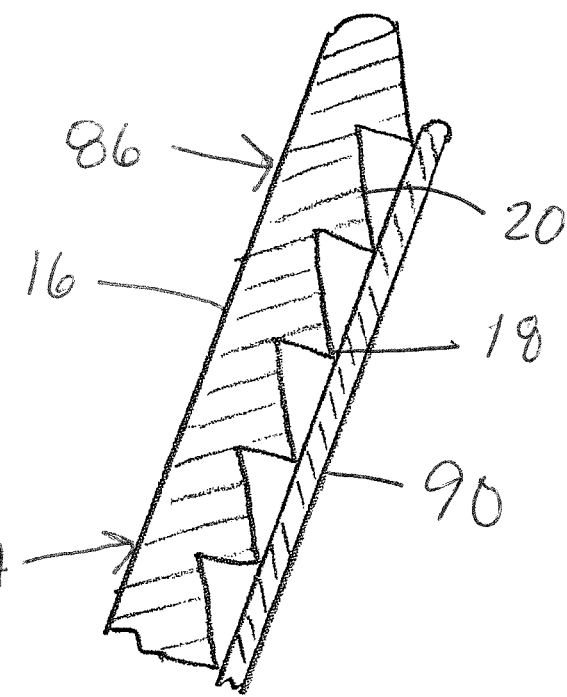
FIG. 8 is a fragmented and enlarged cross-sectional view of a reflector of the raised reflective pavement marker of FIGS. 5 and 7.

FIGS. 5 to 8 illustrate a reflective pavement marker 70 according to a second embodiment of the present invention. The illustrated reflective pavement marker 70 is a non-plowable raised reflective pavement marker. In use, the raised reflective pavement marker 70 is adhered to the top surface of the pavement of a roadway so as to project above the roadway surface and be visible to oncoming vehicles traveling in either direction along the roadway surface. The illustrated pavement marker 70 includes a body or base 72 having a bottom 74 adapted to be secured to the roadway, and at least one reflector 14 on the body and having an outer face 16 for receiving light and an inner face 18 comprising a plurality of light reflecting elements 20 for receiving and reflecting the light back through the outer face 16. The illustrated reflector 14 comprises a light transmitting and thermochromatic polymer adapted to transition to a different color at a predetermined transition temperature so as to change the color of the light reflected by the reflector depending on the temperature of the thermochromatic polymer. FIGS. 5 and 6 illustrate that the illustrated pavement marker 70 can have two reflectors 14 in opposite directions (shown in FIG. 5), or a reflector 14 in only one direction (Shown in FIG. 6). It is also noted that the pavement marker 70 can alternatively have any other suitable configuration, such as, for example, having more than two of the reflectors 14.

The illustrated body or base 72 is in the form of an outer hollow housing or shell 76 with an inner filler or frame 78 located therein. Front and rear sides of the body or base 72 form receiving areas 80 that are each inclined from an angle that is perpendicular to the bottom 74 of the base 72. Typically, the angle is about 45 to 75 degrees from the perpendicular (or, 15 to 45 degrees from the base surface 6). The illustrated sides have an angle of about 60 degrees from the perpendicular. The inclined receiving areas 80 provide a ramp to reduce impact to tires and provide a receiving area that enables the reflectors 14 to be optimally positioned for use. The outer hollow housing or shell 76 is formed of a material that is able to withstand vehicle impact. The filler or frame 78 can include a potting compound, a potting mixture, a molded rib base, or the like. The illustrated receiving areas 80 each include an aperture 82 surrounded by a frame 84. The reflector 14 is connected to the receiving area 80 where at least part is disposed within the aperture 82 and secured to the inner filler or frame 78 such as, for example, by an adhesive. Alternatively, the receiving area 80 can be integrally formed with the reflector 14. That is, the reflector can alternatively be integrally formed with the outer hollow housing or shell 76 which is secured to the inner filler or frame 78. It is noted that the body or base 72 can alternatively have any other suitable configuration.

The illustrated reflectors 14 each include a retroreflective member 86 having an outer viewing surface or face 16 opposite a rear structured surface or face 18. Light incident on the front face 16 passes through and is retroreflected by the reflecting elements 20 at the structured rear face 18 back to the light source through the front face 16. The structured surface or face 18 includes a plurality of the reflecting elements 20 in the form of cube corner elements, also known as prisms, triple mirrors, or other terms used in the art. Each cube corner element is generally a structure having three mutually substantially perpendicular surfaces (optical faces) that cooperate to retroreflect incident light. The optical faces intersect at an apex. Thus, a plurality of apexes protrudes from the retroreflective element on the structured surface. Cavities are formed between the perpendicular surfaces. Each cube corner element also has an optical axis, which is the axis that extends through the cube corner apex. Cube corner elements where the optical axis deviates from a normal to the plane of the retroreflective element are called "canted cube corner elements." In the example shown, the cube corner elements are canted at an angle of about 60 degrees. For performance considerations, cube corner elements can be canted to correspond with the angle of incline of the receiving area.

The illustrated retroreflective member 86 comprises a light transmitting and thermochromatic polymer adapted to transition to a different color at a predetermined transition temperature so as to change the color of the light reflected by the reflector 14 depending on the temperature of the thermochromatic polymer, as discussed above with regard to the first disclosed embodiment of the invention. Also as disclosed above with regard to the first embodiment of the invention, a protective member or overlay 64 can alternatively be provided over the outer face 16 of the retroreflective member 86, a film or plate 66 of light transmitting and thermochromatic polymer can alternatively be provided between the protective member or overlay 64 and the outer face 16 so that the retroreflective member 86 can be alternatively formed any other desired material, or an abrasion resistant coating 68 can be alternatively provided over the outer face 16 of the retroreflective member 86. It is noted that the retroreflective member 86 can alternatively have any other suitable configuration.

The illustrated reflectors 14 also include a film 88 connected to the structured surface 18 at the apexes of the light reflective elements 20 such that a portion of the cube corner elements are spaced apart from the film 88 to form a totally-internal-reflective lens. Ideally, the film 88 touches the structured surface 18 only at the points that are the apexes. Practically, however, this is difficult—the film 88 often also touches part of the perpendicular surfaces at places around the points that are the apex. The apex can also be rounded due to manufacturing tolerances. Even if the apexes "sink into" the film 88, a portion of the cube corner elements still do not touch the film 88 and, thus, are spaced apart from the film 88. The amount of the portion of the cube corner elements that touches the film 88 can vary, but in the example shown, the film contacts the cube corner elements as little as necessary to hold the film 88 in place. Air gaps are created between the film 88 and the non-touching portions of the cube corner element that cooperate to form the totally-internal-reflective lens. The film 88 can comprise any suitable material and can be secured in any suitable manner such as, for example, adhesive. It is noted that the reflectors 14 can alternatively have any other suitable configuration.

It is noted that each of the above described reflectors 14 are of the retroreflector type so that they reflect headlights back to the approaching cars. A retroreflector (sometimes called a retroflector or cataphote) is a device or surface that reflects light back to its source with a minimum of scattering. In a retroreflector an electromagnetic wavefront is reflected back along a vector that is parallel to but opposite in direction from the wave's source. The angle of incidence at which the device or surface reflects light in this way is greater than zero, unlike a planar mirror, which does this only if the mirror is exactly perpendicular to the wave front, having a zero angle of incidence.

Figure 9:
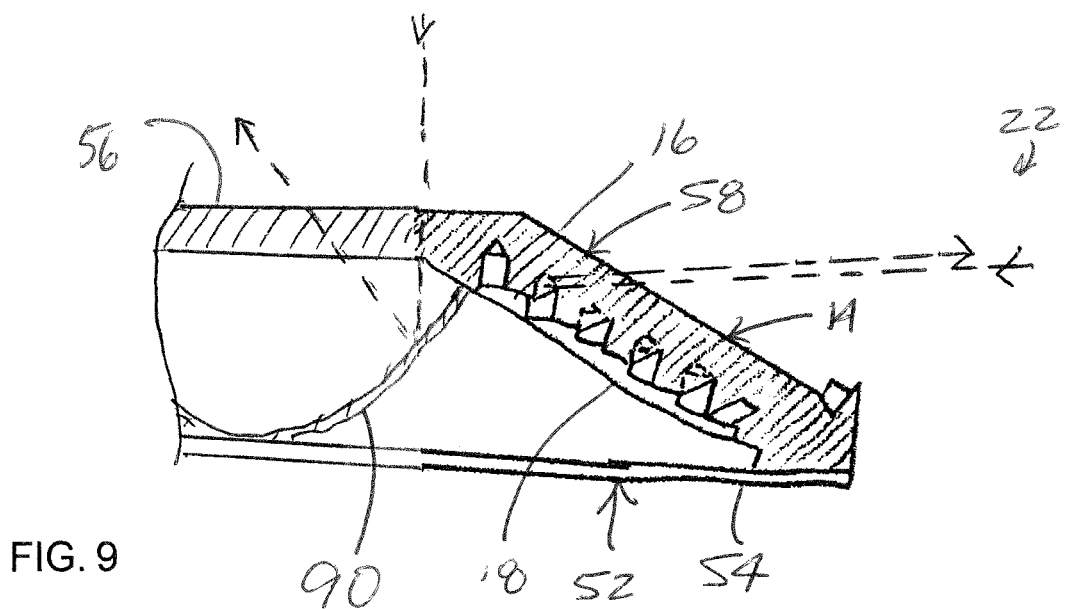
FIG. 9 is a fragmented and enlarged cross-sectional view similar to FIGS. 4A to 5C showing a variation of the road marker wherein there is an additional reflector.

It is also noted that any of the above described road markers 10, 70 can additionally, or alternatively include at least one reflector 90 designed to reflect light from the sun, streetlights, or other external light sources toward the approaching vehicles or other desired directions. Such a configuration can better enable the changing color to be better seen by approaching drivers during daylight hours and from a greater distance during non-daylight hours. FIG. 9 illustrates a variation of the above-described road marker having the at least one reflector 90 within the shell 52 that reflects light entering the shell back through at least one portion of the shell formed of the thermochromatic polymer so that any color change of the polymer can externally be seen when viewing the shell 52. It is noted that the reflector can be of any suitable type and can reflect the light in any suitable direction.

Figure 10:
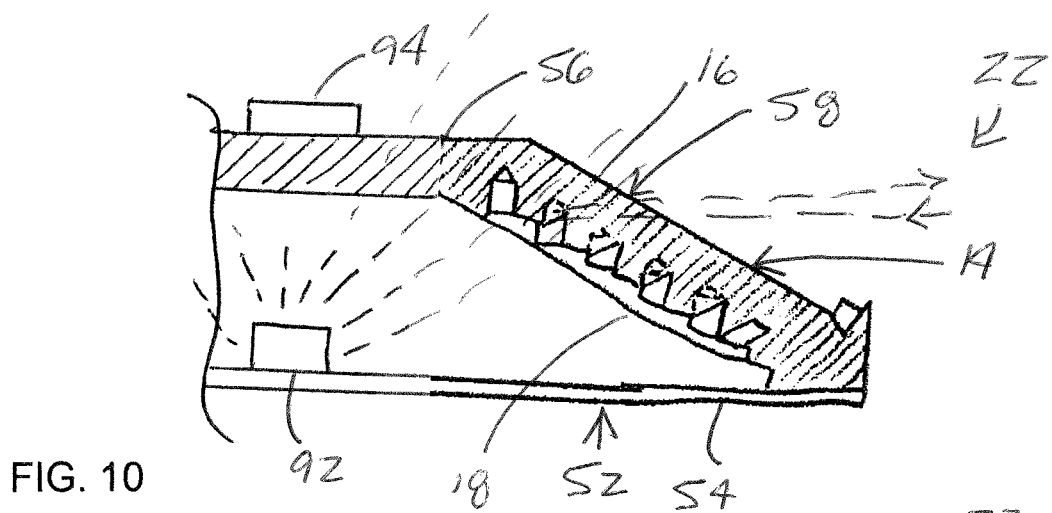
FIG. 10 is a fragmented and enlarged cross-sectional view similar to FIGS. 4A to 5C showing a variation of the road marker wherein there is additionally internal light source.
Figure 11:
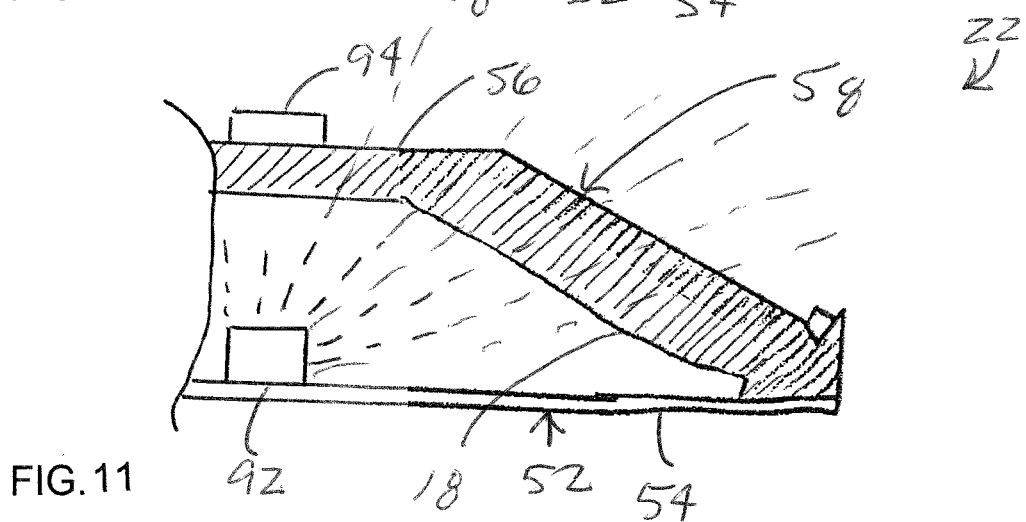
FIG. 11 is a fragmented and enlarged cross-sectional view similar to FIGS. 4A to 5C showing a variation of the road marker wherein there is an internal light source instead of reflectors.

It is further noted that any of the above described road markers 10, 20 can additionally, or alternatively include an internal light source 92 such as, for example, a solar-powered LED light designed to project the changing colors toward the approaching vehicles and or others. Such a configuration can better enable the changing color to be better seen by approaching drivers during daylight hours and from a greater distance during non-daylight hours. FIG. 10 illustrates a variation of the above-described road marker 10 having an LED-type light source 92 located within the shell 52 and powered by and electrically connected to a rechargeable battery and solar cell 94 located at the top wall 56. It is noted that any other suitable light source and/or power source can alternatively be utilized. Light produced by the light source leaves the shell 52 through a portion or all of the shell 52 formed of the thermochromatic polymer and/or the retroreflective reflector 14 described hereinabove. FIG. 11 illustrates a variation of the above-described road marker 10 having the light source 92 within the shell 52 but the retroreflective reflector 14 is eliminated. It is noted that any portions or all of the shell 52 can be formed of the thermochromatic polymer so that the color changing light can be externally viewed as desired.

Any of the features or attributes of the above-described embodiments and variations can be used in combination with any of the other features and attributes of the above-described embodiments and variations as desired.

From the foregoing disclosure and detailed description of certain exemplary embodiments, it will be apparent that the illustrated reflective road markers provide warning of freezing road conditions without being cost prohibitive to manufacture and/or without having an unacceptable degradation under roadway conditions.

From the foregoing disclosure and detailed description of certain preferred embodiments, it will be apparent that various modifications, additions and other alternative embodiments are possible without departing from the true scope and spirit of the present invention. The embodiments discussed were chosen and described to provide the best illustration of the principles of the present invention and its practical application to thereby enable one of ordinary skill in the art to utilize the invention in various embodiments and with various modifications as are suited to the particular use contemplated. All such modifications and variations are within the scope of the present invention as determined by the appended claims when interpreted in accordance with the benefit to which they are fairly, legally, and equitably entitled.

What is claimed is:

1. A reflective pavement marker for a roadway comprising, in combination:
    a base having a bottom adapted to be secured to the roadway;
    a reflector assembly attached on top of the base and comprising at least one reflector formed in a wall having an outer face for receiving light and an inner face opposed to the outer face, the inner face forming a plurality of light reflecting elements for receiving and reflecting the light back through the outer face;
    wherein the wall is formed of a light transmitting and thermochromatic polymer adapted to transition at a predetermined transition temperature so as to change the color of the light received by the outer face and reflected back through the outer face by the reflective elements depending on the temperature of the polymer; and
    wherein the reflector assembly further comprises a protective member overlaying the outer face of the reflector for protecting the thermochromatic polymer from at least one of abrasion and wear.

2. The reflective pavement marker according to claim 1, wherein the at least one reflector is a retroreflective reflector.

3. The reflective pavement marker according to claim 1, wherein the predetermined transition temperature is in the range of 38 degrees Fahrenheit and 30 degrees Fahrenheit.

4. The reflective pavement marker according to claim 3, wherein the predetermined transition temperature is about 34 degrees Fahrenheit.

5. The reflective pavement marker according to claim 1, wherein the thermochromatic polymer is adapted to transition from white above the predetermined transition temperature to blue below the predetermined temperature.

6. The reflective pavement marker according to claim 1, wherein the thermochromatic polymer is adapted to transition from white above the predetermined temperature to purple below the predetermined temperature.

7. The reflective pavement marker according to claim 1, wherein the at least one reflector assembly further comprises a UV light protective layer overlaying the outer face of the reflector for protecting the thermochromatic polymer from UV light.

8. A reflective pavement marker for a roadway comprising, in combination:
    a base having a bottom adapted to be secured to the roadway;
    opposed first and second reflector assemblies secured on top of the base, each of the first and second reflector assemblies comprising a reflector formed in a wall having an outer face for receiving light and an inner face opposed to the outer face, said inner face forming a plurality of light reflecting elements for receiving and reflecting the light back through the outer face; and
    wherein the wall is formed of a light transmitting and thermochromatic polymer adapted to transition at a predetermined transition temperature so as to change the color of the light received by the outer face and reflected back through the outer face by the reflective elements of each of the first and second reflectors depending on the temperature of the polymer; and
    wherein the first and second reflector assemblies each further comprise a protective overlay overlaying the outer face of the reflector for protecting the thermochromatic polymer from at least one of abrasion and wear.

9. The reflective pavement marker according to claim 8, wherein the first and second reflectors are each retroreflective reflectors.

10. The reflective pavement marker according to claim 8, wherein the predetermined transition temperature is in the range of 38 degrees Fahrenheit and 30 degrees Fahrenheit.

11. The reflective pavement marker according to claim 10, wherein the predetermined transition temperature is about 34 degrees Fahrenheit.

12. The reflective pavement marker according to claim 8, wherein the thermochromatic polymer is adapted to transition from white above the predetermined transition temperature to blue below the predetermined temperature.

13. The reflective pavement marker according to claim 8, wherein the thermochromatic polymer is adapted to transition from white above the predetermined temperature to purple below the predetermined temperature.

14. The reflective pavement marker according to claim 8, wherein the first and second reflector assemblies each further comprise a UV light protective layer overlaying the outer face of the reflector for protecting the thermochromatic polymer from UV light.

15. A reflective pavement marker for a roadway comprising, in combination:
  a base having a bottom adapted to be secured to the roadway;
  a reflector assembly attached on top of the base and comprising at least one reflector formed in a wall having an outer face for receiving light and an inner face opposed to the outer face, the inner face forming a plurality of light reflecting elements for receiving and reflecting the light back through the outer face;
  wherein the wall is formed of a light transmitting and thermochromatic polymer adapted to transition at a predetermined transition temperature so as to change the color of the light received by the outer face and reflected back through the outer face by the reflective elements depending on the temperature of the polymer; and
  wherein the reflector assembly further comprises a UV protective layer overlaying the outer face of the reflector for protecting the thermochromatic polymer from UV light.

16. The reflective pavement marker according to claim 15, wherein the at least one reflector is a retroreflective reflector.

17. The reflective pavement marker according to claim 15, wherein the predetermined transition temperature is in the range of 38 degrees Fahrenheit and 30 degrees Fahrenheit.

18. The reflective pavement marker according to claim 17, wherein the predetermined transition temperature is about 34 degrees Fahrenheit.

19. The reflective pavement marker according to claim 15, wherein the thermochromatic polymer is adapted to transition from white above the predetermined transition temperature to blue below the predetermined temperature.

20. The reflective pavement marker according to claim 15, wherein the thermochromatic polymer is adapted to transition from white above the predetermined temperature to purple below the predetermined temperature.

* * * * *